US011155419B1

(12) United States Patent
Lu et al.

(10) Patent No.: US 11,155,419 B1
(45) Date of Patent: Oct. 26, 2021

(54) DYNAMIC RELIABILITY EVALUATION METHOD FOR COUPLING FAULTS OF MIDDLE TROUGH OF SCRAPER CONVEYOR

(71) Applicant: China University of Mining and Technology, Jiangsu (CN)

(72) Inventors: Hao Lu, Jiangsu (CN); Zhencai Zhu, Jiangsu (CN); Fan Jiang, Jiangsu (CN); Wei Li, Jiangsu (CN); Yuxing Peng, Jiangsu (CN); Gongbo Zhou, Jiangsu (CN); Gang Shen, Jiangsu (CN); Dagang Wang, Jiangsu (CN); Yu Tang, Jiangsu (CN); Xiang Li, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/042,952

(22) PCT Filed: Jul. 26, 2019

(86) PCT No.: PCT/CN2019/097907
§ 371 (c)(1),
(2) Date: Sep. 29, 2020

(87) PCT Pub. No.: WO2020/232825
PCT Pub. Date: Nov. 26, 2020

(30) Foreign Application Priority Data

May 21, 2019 (CN) .......................... 201910422671.X

(51) Int. Cl.
*B65G 43/02* (2006.01)
*G06F 17/17* (2006.01)
(Continued)

(52) U.S. Cl.
CPC ............. *B65G 43/02* (2013.01); *G06F 17/17* (2013.01); *G06F 17/18* (2013.01); *B65G 2203/0275* (2013.01); *B65G 2812/02891* (2013.01)

(58) Field of Classification Search
None
See application file for complete search history.

(56) References Cited

U.S. PATENT DOCUMENTS

2016/0283621 A1    9/2016   Yang et al.

FOREIGN PATENT DOCUMENTS

CN    102801157    11/2012
CN    102945223    2/2013
(Continued)

OTHER PUBLICATIONS

"International Search Report (Form PCT/ISA/210) of PCT/CN2019/097907," dated Mar. 2, 2020, pp. 1-5.
(Continued)

*Primary Examiner* — Kavel Singh
(74) *Attorney, Agent, or Firm* — JCIPRNET

(57) ABSTRACT

The present invention discloses a dynamic reliability evaluation method for coupling faults of a middle trough of a scraper conveyor. Approximation precision of a moment-based saddlepoint approximation method and a function attribute of dynamic t-copula are fully utilized, and the dynamic reliability evaluation method for the coupling faults of the middle trough of the scraper conveyor is provided, so that dynamic correlation between failure modes of the middle trough of the scraper conveyor under a small sample condition is more accurately described, and accuracy of dynamic reliability evaluation of the coupling faults of the middle trough of the scraper conveyor is improved.

6 Claims, 5 Drawing Sheets

(51) Int. Cl.
     *G06F 17/18*     (2006.01)
     *B65G 19/28*     (2006.01)

(56)           References Cited

FOREIGN PATENT DOCUMENTS

| | | | | |
|---|---|---|---|---|
| CN | 107225360 | A | * | 10/2017 |
| CN | 107291989 | | | 10/2017 |
| CN | 107704677 | | | 2/2018 |
| CN | 107832511 | | | 3/2018 |
| CN | 207258563 | U | * | 4/2018 |
| CN | 108588549 | A | * | 9/2018 |
| CN | 109766670 | | | 5/2019 |
| CN | 110288188 | | | 9/2019 |

OTHER PUBLICATIONS

Yoojeong Noh, et al., "Reliability-based design optimization of problems with correlated input variables using a Gaussian Copula," Structural and Multidisciplinary Optimization, Mar. 2009, pp. 1-16.

* cited by examiner

DYNAMIC RELIABILITY EVALUATION METHOD FOR COUPLING FAULTS OF MIDDLE TROUGH OF SCRAPER CONVEYOR

CROSS-REFERENCE TO RELATED APPLICATION

This application is a 371 application of the International PCT application serial no. PCT/CN2019/097907, filed on Jul. 26, 2019, which claims the priority benefits of China Patent Application No. 201910422671.X, filed on May 21, 2019. The entirety of each of the above-mentioned patent applications is hereby incorporated by reference herein and made a part of this specification.

FIELD OF THE INVENTION

The present invention relates to the technical field of mine transportation equipment, and particularly relates to a dynamic reliability evaluation method for coupling faults of a middle trough of a scraper conveyor.

DESCRIPTION OF RELATED ART

Deep resource development and utilization is a national development strategy, a scraper conveyor is key equipment to achieve deep resource development, and safe and stable operation of the scraper conveyor has important significance on realization of coal mining. Operation conditions of underground transportation equipment are complicated, and work conditions are extremely poor, so that the performance degradation process of equipment such as the scraper conveyor is intensified, and the actual service life of the equipment is reduced. Therefore, accurate and reasonable evaluation and prediction on reliability of key components of the scraper conveyor are of great significance on guaranteeing safe operation of the equipment and improving economic benefits. A middle trough of the scraper conveyor is a machine body of the scraper conveyor and consists of a middle plate, trough upper steel and the like, an upper trough is used for transporting coal, and a lower trough is used for returning of a scraper chain. The middle trough of the scraper conveyor is a main body and a main failure part of the scraper conveyor, so that the service life and reliability of the middle trough are very important for safe and efficient coal mining and economic benefits of enterprises. Under poor work conditions, a dynamic load borne by the middle trough of the scraper conveyor may cause structural fatigue failure, and the fatigue failure is mainly affected by two failure modes including fracture failure and static strength failure. Traditional reliability evaluation only aims at one of the failure modes, or it is assumed that the two failure modes are independent of each other, and the influence on the fatigue failure of the middle trough of the scraper conveyor under the joint effect of the fracture failure and the static strength failure is not considered. In fact, the dynamic load in an operation process of the scraper conveyor may cause continuous expansion of material cracks of the middle trough, and the static strength of the middle trough also changes, thus causing continuous degradation of the fatigue strength of the middle trough. Therefore, under the effect of a homologous load, correlation exists between the fracture strength and the static strength of the middle trough of the scraper conveyor, and additionally, the degree of correlation may change along with the operation time. Therefore, it is necessary to model the dynamic correlation between the fracture failure and the static strength failure of the middle trough of the scraper conveyor so as to realize the dynamic reliability evaluation on the coupling faults of the middle trough of the scraper conveyor under the effect of the dynamic load. Aiming at the problem of joint failure of fracture and static strength of the middle trough of the scraper conveyor under the small sample condition, the present invention provides a dynamic reliability evaluation method of the coupling faults by using a saddlepoint approximation method based on four moments and a dynamic t-copula function.

In the following documents:
[1] Reliability Evaluation Method for Main Shaft of Kilometer Deep Shaft Hoist by Considering Multiple Failure Modes [P], patent for invention, ZL201710377138.7.
[2] Noh Y, Choi K K, Du L. Reliability-based design optimization of problems with correlated input variables using a Gaussian Copula [J]. Structural and multidisciplinary optimization, 2009, 38(1): 1-16.
[3] Reliability Evaluation Method of Wind and Photovoltaic Complementary Power Generation System Based on Copula Theory [P], patent for invention, ZL201210257528.8.

In document 1, Clayton copula is used for joint probabilistic modeling of strength and stiffness of a main shaft of a hoist. The provided method only aims at the problem of static reliability evaluation, the Clayton copula adopted can only be used for building probability correlation at a specific moment, the dynamic reliability problem that the strength and stiffness of the main shaft of the hoist change along with time is not considered, and static reliability and dynamic reliability problems have essential differences in aspects of analysis ideas and processing methods. Additionally, a saddlepoint approximation method used in this document is only applicable to an existence condition of a cumulant generating function of a random variable, and the applicability of the method is limited when there is only probabilistic statistical moment information of failure data.

In document 2, a probabilistic correlation modeling method for multiple failure modes based on a Gaussian copula function is provided. The method assumes that correlation structures among failure modes all conform to a Gaussian copula function structure, the method is only applicable to symmetric correlation modeling, and the modeling precision of the method is poor when relationship among the failure modes is asymmetrical correlation.

In document 3, a reliability evaluation method for a power generation system based on a copula theory is provided. According to the method, building of probability distribution is realized by collecting a large number of samples, and solution of cumulative probability distribution is performed by an integral method, and the method is not applicable to the small-sample condition. Additionally, a Frank copula function adopted cannot describe asymmetric probability correlation.

SUMMARY OF THE INVENTION

Aiming at defects in the prior art, the present invention builds a dynamic reliability evaluation method for coupling faults of a middle trough of a scraper conveyor by using a moment-based saddlepoint approximation method and a dynamic t-copula function, so that dynamic correlation between failure modes of the middle trough of the scraper conveyor under a small sample condition is more accurately described, and precision of dynamic reliability evaluation of the coupling faults of the middle trough of the scraper conveyor is improved.

In order to achieve the above objective, the present invention adopts the technical solution:

A dynamic reliability evaluation method for a coupling faults of a middle trough of a scraper conveyor is provided, and includes the following steps:

step 1: defining a data collection time point, collecting data samples such as a crack length, a middle plate width, fracture toughness, yield strength and a fatigue load of the middle trough of the scraper conveyor at different operation time points, and counting first four moment probability information of all the data samples;

step 2: respectively defining performance functions in two failure modes according to failure criteria of fracture failure and static strength failure of the middle trough of the scraper conveyor;

step 3: on the basis of the first four moment probability information of all the data samples of the middle trough of the scraper conveyor, building a probability distribution function of each failure mode by using the fourth moment-based saddlepoint approximation method, and calculating failure probabilities of fracture failure and static strength failure modes at different time points;

step 4: building a dynamic probability correlation structure between the fracture strength and static strength failure modes of the middle trough of the scraper conveyor by using the dynamic copula function, and further building a dynamic joint probability distribution function between the failure modes; and step 5: performing dynamic reliability evaluation on the coupling faults of the middle trough of the scraper conveyor in combination with the probability distribution function and the dynamic joint probability distribution function of each failure mode of the middle trough of the scraper conveyor and by using a system reliability theory.

For details in step 1:
The first four moment probability information of all the data samples of the middle trough of the scraper conveyor refers to a mean, a variance, skewness and kurtosis.

For details in step 2:
The performance function of the fracture failure mode is defined according to whether a maximum stress strength factor of the middle trough of the scraper conveyor exceeds fracture toughness or not, and the performance function of the static strength failure is defined according to whether a structure resistance of the middle trough of the scraper conveyor is greater than the fatigue load or not.

For details in step 3:
A form of the probability distribution function built by using the moment-based saddlepoint approximation method is $$F_Y(y) = \Phi\left[\omega_{ye} + \frac{1}{\omega_{ye}}\ln\left(\frac{v_{ye}}{\omega_{ye}}\right)\right],$$

wherein $\omega_{ye}$ and $v_{ye}$ are parameters of the function, and may be calculated by the following formulas:

$$\omega_{ye} = \text{sign}(t_e)\sqrt{2[y_e t_e - K_{Ys}(t_e)]} \text{ and}$$

$$v_{ye} = t_e\sqrt{K_{Ys}^{(2)}(t_e)},$$

wherein $y_e$ represents a standardized variable of a performance function state variable, $K_{Ys}$ represents a cumulant generating function of the standardized variable, $K_{Ys}^{(2)}$ represents a second derivative of the cumulant generating function, and $t_e$ represents a saddle point value, and may be calculated by the following formulas:

$$t_1 = \frac{-\sqrt{(16a_2a_3 + (y-a_1)^2)b^2 - 4a_2(y-a_1)b + 4a_2^2} + (y-a_1)b + 2a_2}{4ba_2}$$

and $$t_2 = \frac{-\sqrt{(16a_2a_3 + (y-a_1)^2)b^2 - 4a_2(y-a_1)b + 4a_2^2} + (y-a_1)b + 2a_2}{4ba_2},$$

wherein y is a second-order reliability index of the performance function, $t_1$ and $t_2$ represent two solutions of a saddlepoint equation, and a value meeting calculation reasonability is taken as a saddle point value in practical calculation; and $$a_1 = -\frac{9\theta_{Ys}^3}{2(\eta_{Ys}-3)^2}, a_2 = \frac{-3\theta_{Ys}^3 + 2\eta_{Ys} - 6}{4(\eta_{Ys}-3)}, a_3 = \frac{27\theta_{Ys}^4}{4(\eta_{Ys}-3)^3}, b = \frac{\eta_{Ys}-3}{3\theta_{Ys}}$$

wherein $\theta_{Ys}$ and $\eta_{Ys}$ respectively represent skewness and kurtosis of the performance function.

wherein $\theta_{Ys}$ and $\eta_{Ys}$ respectively represent skewness and kurtosis of the performance function.

For details in step 4:
The dynamic copula function uses a dynamic t-copula function in a form:

$$C_t(u_1, u_2 \mid \rho, k) = \int_{-\infty}^{\tau_k^{-1}(u_1)} \int_{-\infty}^{\tau_k^{-1}(u_2)} \frac{1}{2\pi\sqrt{1-\rho^2}}\left[1 + \frac{s^2 - 2\rho st + t^2}{k(1-\rho^2)}\right]^{-(k+2)/2} ds\,dt,$$

wherein k and p are parameters of the dynamic t-copula function, k is an invariable parameter, and p is a time-varying parameter; a value of the time-varying parameter p at different time points may be obtained in combination with the data samples collected at different time points through a maximum likelihood estimation method; and $u_1$ and $u_2$ represent obtained failure probabilities in the fracture failure mode and the static strength failure mode through calculation in step 3.

For details in step 5:

According to the obtained failure probabilities $u_1$ and $u_2$ in the fracture failure mode and the static strength failure mode of the middle trough of the scraper conveyor in step 3, and the obtained dynamic joint probability distribution function between the two failure modes in step 4, dynamic reliability of the coupling faults of the middle trough of the scraper conveyor is calculated by the following formula, specifically:

$$P_f = u_1 + u_2 - P(u_1, u_2 | \rho),$$

wherein $P(u_1, u_2 | \rho)$ is a joint failure probability obtained through calculation according to the dynamic joint probability distribution function in step 4; and through calculation on reliability of different time points, the dynamic reliability evaluation on the coupling faults of the middle trough of the scraper conveyor is obtained.

Due to adoption of the above technical solution, the present invention at least has the following beneficial effects:

(1) Aiming at a condition that a quantity of data samples of the middle trough of the scraper conveyor is small, the method can approximate the probability distribution function in the fracture failure mode and the static strength failure mode by using the first four moment probability information of the data samples under the small-sample condition, so that precision of probability distribution approximation is improved.

(2) The present invention sufficiently considers probability attributes such as positive correlation, negative correlation and asymmetric correlation possibly existing between the failure modes of the middle trough of the scraper conveyor, the dynamic t-copula function capable of adapting to different correlation attributes is selected to perform dynamic joint failure probability modeling, and the flexibility of probability correlation modeling of the middle trough of the scraper conveyor with multiple failure modes is improved.

(3) The present invention sufficiently considers dynamic correlation between the fracture failure mode and the static strength failure mode influencing fatigue strength of the middle trough of the scraper conveyor, a dynamic correlation structure between the failure modes is described by estimating the time-varying parameters of the dynamic t-copula function, and the accuracy of the dynamic reliability evaluation of the coupling faults of the middle trough of the scraper conveyor is improved.

DETAILED DESCRIPTION OF THE INVENTION

The present invention is further described below with reference to the accompanying drawings and embodiments.

Figure 1:
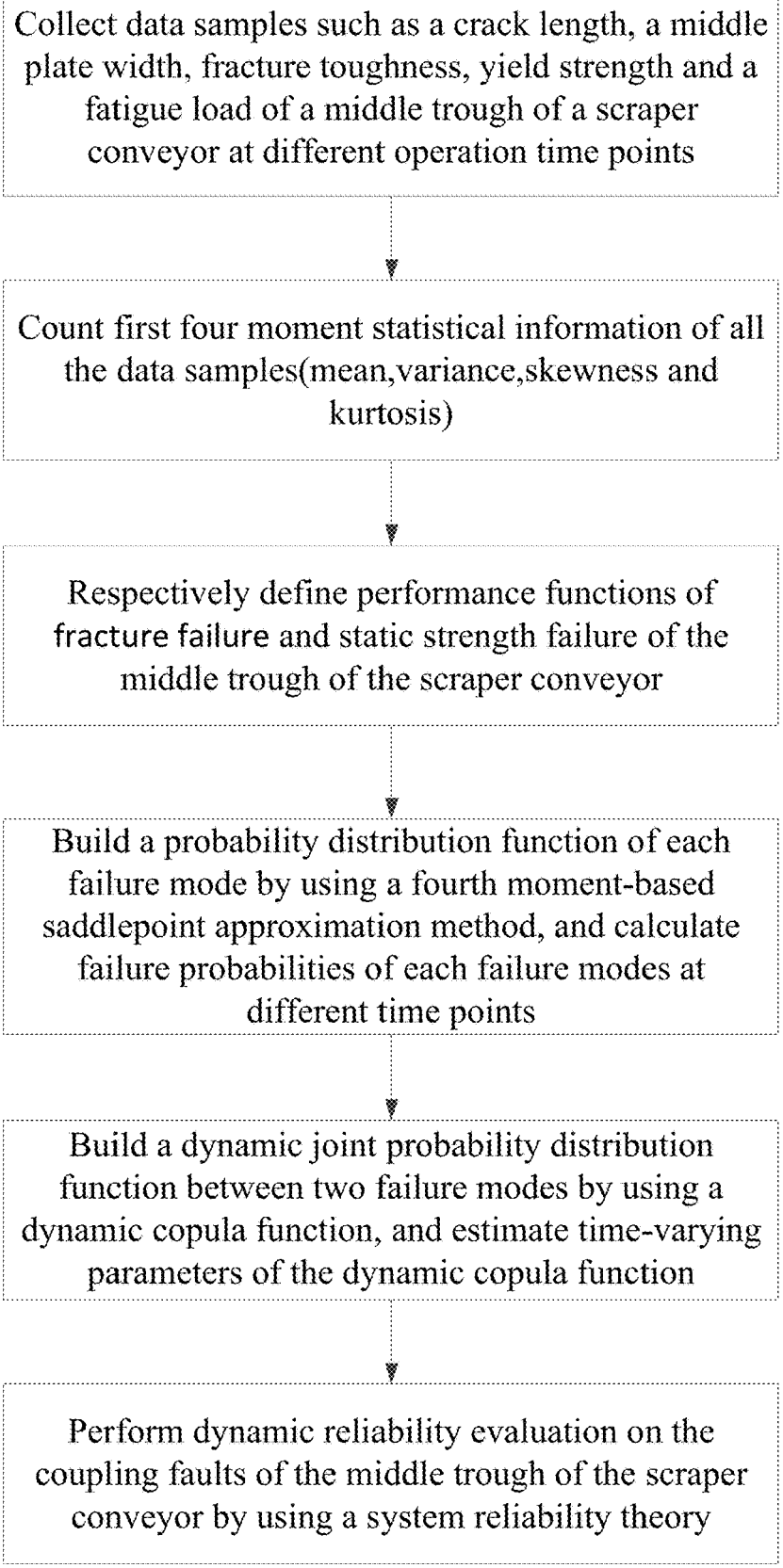
FIG. 1 is a flow chart of the present invention.

As shown in FIG. 1, a dynamic reliability evaluation method for a coupling faults of a middle trough of a scraper conveyor provided by the present invention includes the following steps:

step 1: collecting data samples such as a crack length, a middle plate width, fracture toughness, yield strength and a fatigue load of the middle trough at different operation time points in combination with practical work conditions of the middle trough of an underground scraper conveyor, and counting probability information such as a mean, a variance, skewness and kurtosis of all the data samples;

step 2: defining a reliability performance function of fracture failure of the middle trough according to relationship between a maximum stress strength factor of the middle trough of the scraper conveyor and a fracture toughness value, and defining a reliability performance function of the static strength failure of the middle trough according to relationship between a structure resistance of the middle trough and a fatigue load;

step 3: on the basis of first four moment probability information obtained in step 1, calculating first four moments of the middle trough in fracture failure and static strength failure modes, further obtaining probability distribution functions of each failure mode by using a saddlepoint approximation method based on four moments, and calculating failure probabilities in two failure modes at different time points;

step 4: generating random response samples in each failure mode in combination with the obtained probability distribution functions of the middle trough of the scraper conveyor in different failure modes in step 3, performing normalization processing, performing calculation by a statistical method to obtain a rank correlation coefficient between different sample sequences, further estimating time-varying parameters of a dynamic t-copula function at different time points, and further building a dynamic joint probability distribution model based on the dynamic t-copula function; and step 5: calculating a coupling failure probability of the middle trough at different time points in combination with a marginal probability distribution function and the joint probability distribution model based on the dynamic t-copula function respectively obtained in step 3 and step 4 and by using a system reliability theory.

Embodiment

Figure 2:
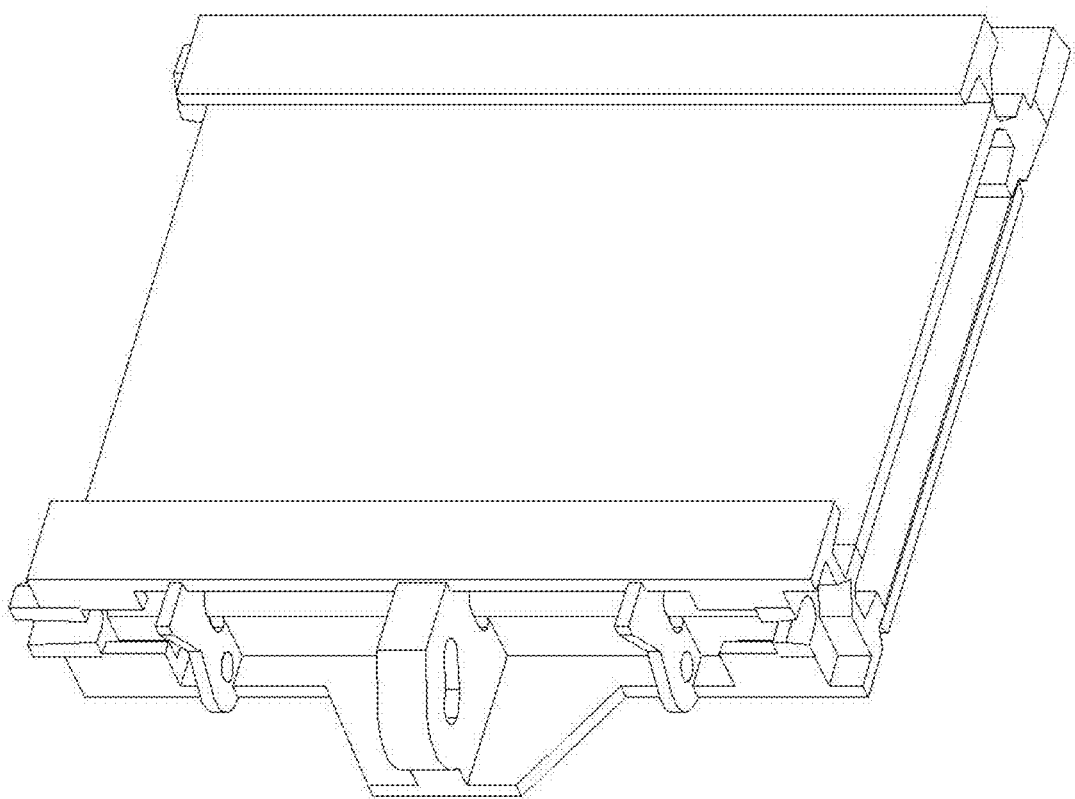
FIG. 2 is a structural diagram of a middle trough of a scraper conveyor according to an embodiment of the present invention.

In order to more sufficiently know characteristics and engineering applicability of the present invention, the present invention performs dynamic reliability evaluation on a coupling faults by aiming at a structure of a middle trough of a scraper conveyor as shown in FIG. 2.

(1) Data samples (such as a crack length, a middle plate width, fracture toughness, yield strength and a fatigue load) of fracture failure and static strength failure of the middle trough of the scraper conveyor at different time points are collected to obtain first four moment probability information of each sample.

(2) According to safety criteria of fracture failure and static strength failure of the middle trough of the scraper conveyor, reliability performance functions in fracture failure and static strength failure are respectively built, and are:

$g_1 = K_K - K_{max}$ and $g^2 = Q - S,$ wherein is fracture toughness of the middle trough of the scraper conveyor, $K_{max}$, is a maximum stress strength factor of the middle trough of the scraper conveyor, $K_{max}$ is a function of random variables of a crack expansion length, a material attribute and the like, Q is structure resistance of the middle trough of the scraper conveyor, Q is a function of the crack expansion length, and S is a fatigue load.

(3) On the basis of probability information of each random variable in the data samples, a statistical method is used for obtaining first four moments, i.e. the mean, the variance, the skewness and the kurtosis, of the performance functions in the fracture failure and static strength failure modes. A saddlepoint approximation method based on four moments is used for respectively obtaining the failure probabilities in the fracture failure and static strength failure at different time points through calculation. Specifically:

a form of the probability distribution function built by using the moment-based saddlepoint approximation method is $$F_Y(y) = \Phi\left[\omega_{ye} + \frac{1}{\omega_{ye}}\ln\left(\frac{v_{ye}}{\omega_{ye}}\right)\right],$$

wherein $\omega_{ye}$ and $v_{ye}$ are parameters of the function, and may be calculated by the following formulas:

$\omega_{ye} = \text{sign}(t_e)\sqrt{2[y_e t_e - K_{Ys}(t_e)]}$ and $v_{ye} = t_e\sqrt{K_{Ys}^{(2)}(t_e)}$, wherein $y_e$ represents a standardized variable of a performance function state variable, $K_{Ys}$ represents a cumulant generating function of the standardized variable, $K_{Ys}^{(2)}$ represents a second derivative of the cumulant generating function, and $t_e$ represents a saddle point value, and may be calculated by the following formulas:

$$t_1 = \frac{-\sqrt{(16a_2 a_3 + (y - a_1)^2)b^2 - 4a_2(y - a_1)b + 4a_2^2} + (y - a_1)b + 2a_2}{4ba_2}$$

and $$t_2 = \frac{-\sqrt{(16a_2 a_3 + (y - a_1)^2)b^2 - 4a_2(y - a_1)b + 4a_2^2} + (y - a_1)b + 2a_2}{4ba_2},$$

wherein y is a second-order reliability index of the functional function, $t_1$ and $t_2$ represent two solutions of a saddlepoint equation, and a value meeting calculation reasonability is taken as a saddle point value in practical calculation; and $$a_1 = -\frac{9\theta_{Ys}^3}{2(\eta_{Ys} - 3)^2}, a_2 = \frac{-3\theta_{Ys}^3 + 2\eta_{Ys} - 6}{4(\eta_{Ys} - 3)}, a_3 = \frac{27\theta_{Ys}^4}{4(\eta_{Ys} - 3)^3}, b = \frac{\eta_{Ys} - 3}{3\theta_{Ys}}$$

wherein $\theta_{Ys}$ and $\eta_{Ys}$ respectively represent skewness and kurtosis of the functional function.

Figure 3:
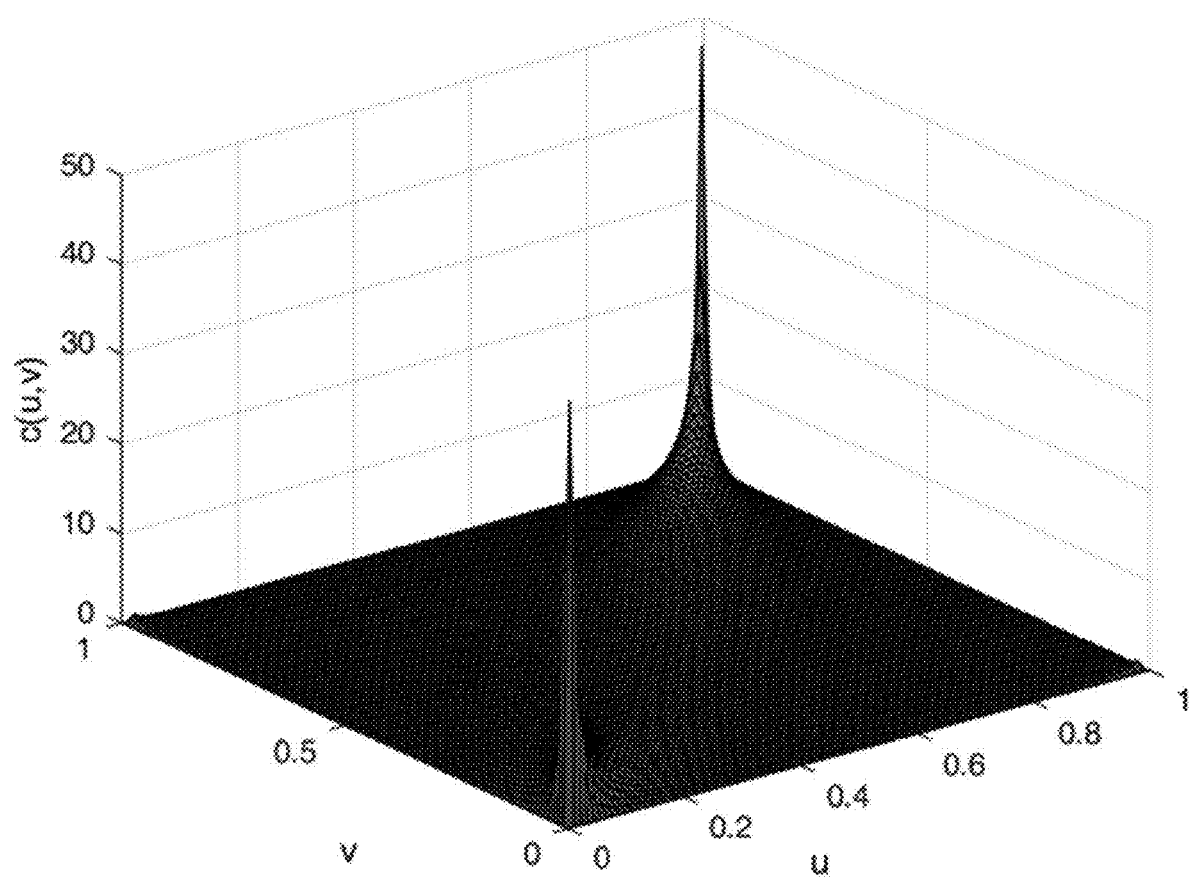
FIG. 3 is a probability density diagram of a dynamic t-copula function.
Figure 4:
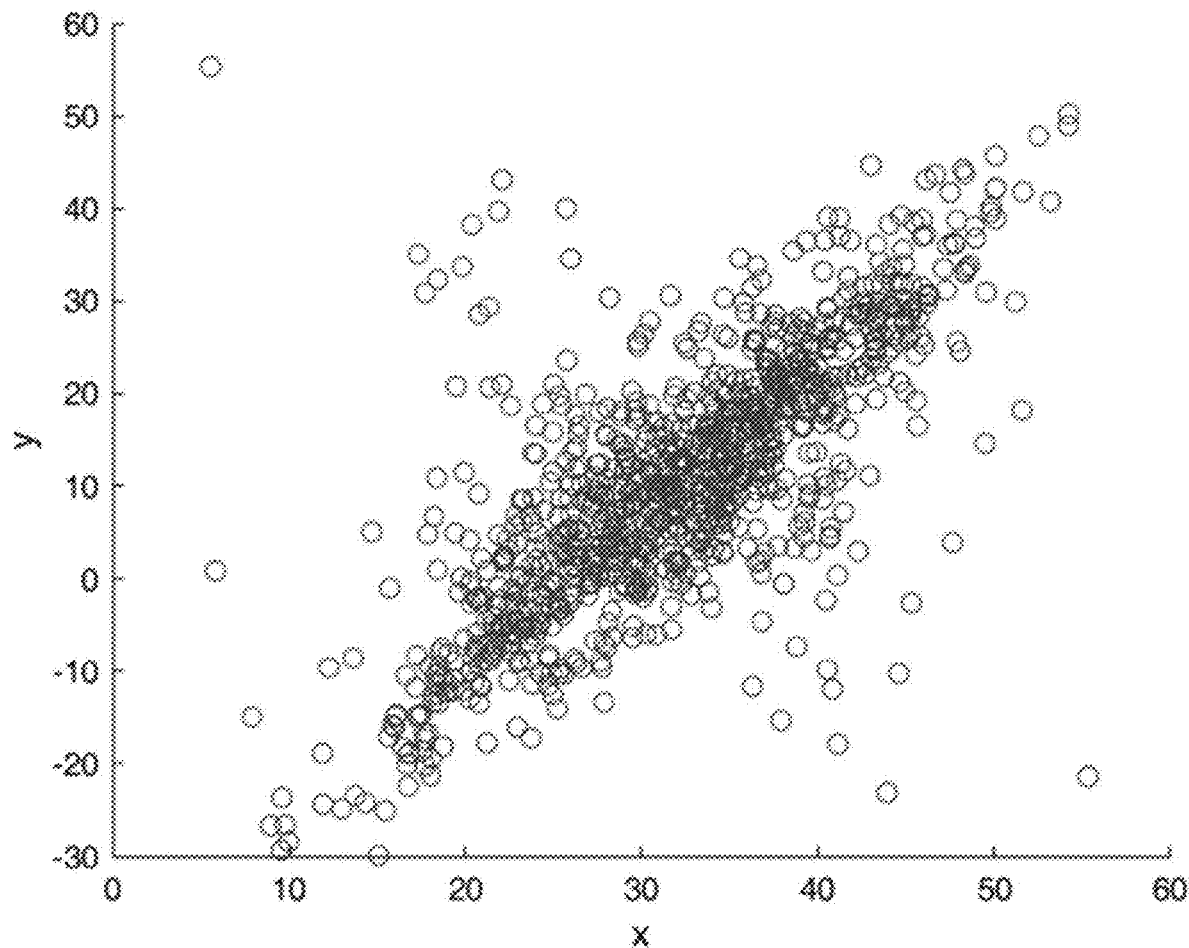
FIG. 4 is a scatter diagram of the dynamic t-copula function.

(4) By considering dynamic correlation of fracture failure and static strength failure, a dynamic t-copula function is used for building a dynamic correlation model between two failure modes. A probability density diagram of a dynamic t-copula function is shown in FIG. 3, and a scatter diagram of the dynamic t-copula function is shown in FIG. 4.

On the basis of reliability performance functions of the middle trough of the scraper conveyor in fracture failure and static strength failure, a rank correlation coefficient between the two failure modes is obtained by a sampling method through calculation, and variation rules of the time-varying parameters of the dynamic t-copula function are further obtained. For details in step 4:

the dynamic copula function uses a dynamic t-copula function in a form:

$$C_t(u_1, u_2 \mid \rho, k) = \int_{-\infty}^{\tau_k^{-1}(u_1)} \int_{-\infty}^{\tau_k^{-1}(u_2)} \frac{1}{2\pi\sqrt{1-\rho^2}}\left[1 + \frac{s^2 - 2\rho st + t^2}{k(1-\rho^2)}\right]^{-(k+2)/2} ds dt,$$

wherein k and p are parameters of the dynamic t-copula function, k is an invariable parameter, and p is a time-varying parameter; a value of the time-varying parameter p at different time points may be obtained in combination with the data samples collected at different time points through a maximum likelihood estimation method; and $u_1$ and $u_2$ represent obtained failure probabilities in the fracture failure mode and the static strength failure mode through calculation in step 3.

Figure 5:
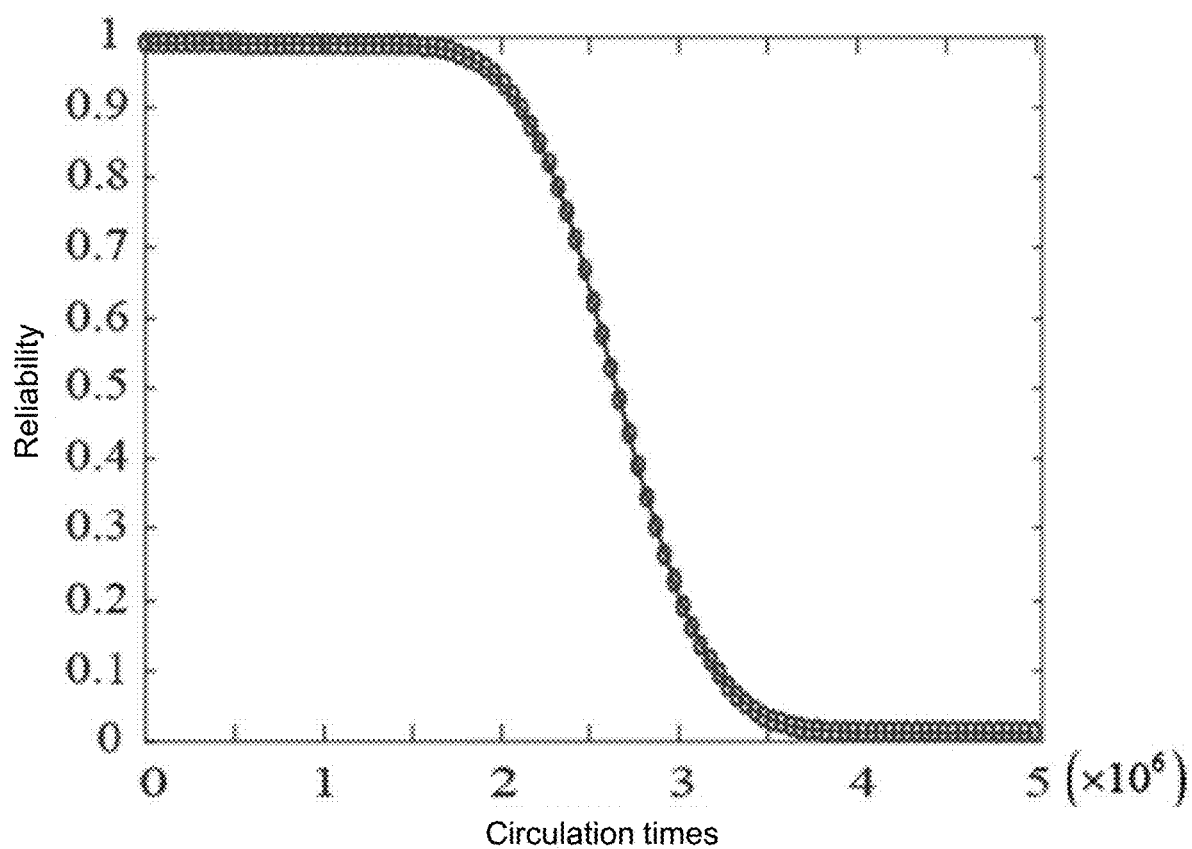
FIG. 5 is a dynamic reliability curve diagram of a coupling faults of a middle trough of a scraper conveyor.

(5) On the basis of the failure probabilities of the fracture failure and static strength failure of the middle trough of the scraper conveyor and a joint probability failure probability of the dynamic t-copula function, dynamic reliability of the middle trough of the scraper conveyor under a coupling faults condition at different time points (load action times) is calculated, and a reliability curve is shown in FIG. 5.

For details in step 5:

according to the obtained failure probabilities $u_1$ and $u_2$ in the fracture failure mode and the static strength failure mode of the middle trough of the scraper conveyor in step 3, and the obtained dynamic joint probability distribution function between the two failure modes in step 4, dynamic reliability of the coupling faults of the middle trough of the scraper conveyor is calculated by the following formula, specifically:

$P_f = u_1 + u_2 - P(u_1, u_2 \mid \rho),$ wherein $P(u_1, u_2 \mid \rho)$ is a joint failure probability obtained through calculation according to the dynamic joint probability distribution function in step 4; and through calculation on reliability at different time points, the dynamic reliability evaluation on the coupling faults of the middle trough of the scraper conveyor is obtained.

What is claimed is:

1. A dynamic reliability evaluation method for coupling faults of a middle trough of a scraper conveyor, comprising the following steps:
   - step 1: defining a data collection time point, collecting data samples such as a crack length, a middle plate width, a fracture toughness, a yield strength and a fatigue load of the middle trough of the scraper conveyor at different operation time points, and counting first four moment probability information of each category of the data samples;
   - step 2: respectively defining performance functions in two failure modes according to fracture failure criteria and static strength failure criteria of the middle trough of the scraper conveyor;
   - step 3: on a basis of the first four moment probability information of each category of the data samples of the middle trough of the scraper conveyor, building a probability distribution function of each failure mode by using a moment-based saddlepoint approximation method, and calculating failure probabilities of fracture failure mode and static strength failure mode at different time points;
   - step 4: building a dynamic probability correlation structure between the fracture strength mode and the static strength failure mode of the middle trough of the scraper conveyor by using a dynamic copula function, and further building a dynamic joint probability distribution function between the failure modes; and
   - step 5: performing dynamic reliability evaluation on the coupling faults of the middle trough of the scraper conveyor in combination with the probability distribution function and the dynamic joint probability distribution function of each failure mode of the middle trough of the scraper conveyor and by using a system reliability theory.

2. The dynamic reliability evaluation method for a coupling faults of a middle trough of a scraper conveyor according to claim 1, wherein for details in the step 1:
   the first four moment probability information of all the data samples of the middle trough of the scraper conveyor refers to a mean, a variance, skewness and kurtosis.

3. The dynamic reliability evaluation method for coupling faults of a middle trough of a scraper conveyor according to claim 1, wherein for details in the step 2:
   the performance function of the fracture failure mode is defined according to whether a maximum stress strength factor of the middle trough of the scraper conveyor exceeds the fracture toughness or not, and the performance function of the static strength failure mode is defined according to whether a structure resistance of the middle trough of the scraper conveyor is greater than the fatigue load or not.

4. The dynamic reliability evaluation method for a coupling faults of a middle trough of a scraper conveyor according to claim 1, wherein for details in the step 3:
   a form of the probability distribution function built by using the moment-based saddlepoint approximation method is $$F_Y(y) = \Phi\left[\omega_{ye} + \frac{1}{\omega_{ye}} \ln\left(\frac{\upsilon_{ye}}{\omega_{ye}}\right)\right],$$

wherein $\omega_{ye}$ and $\upsilon_{ye}$ are parameters of the function, and may be calculated by the following formulas:

$\omega_{ye} = \text{sign}(t_e)\sqrt{2[y_e t_e - K_{Y_s}(t_e)]}$ and $\upsilon_{ye} = t_e\sqrt{K_{Y_s}^{(2)}(t_e)}$ wherein $y_e$ represents a standardized variable of a performance function state variable, $K_{Y_s}$ represents a cumulant generating function of the standardized variable, $K_{Y_s}^{(2)}$ represents a second derivative of the cumulant generating function, and $t_e$ represents a saddle point value, and may be calculated by the following formulas:

$$t_1 = \frac{-\sqrt{(16 a_2 a_3 + (y-a_1)^2)b^2 - 4a_2(y-a_1)b + 4a_2^2} + (y-a_1)b + 2a_2}{4 b a_2}$$

and $$t_2 = \frac{-\sqrt{(16 a_2 a_3 + (y-a_1)^2)b^2 - 4a_2(y-a_1)b + 4a_2^2} + (y-a_1)b + 2a_2}{4 b a_2},$$

wherein y is a second-order reliability index of the performance function, $t_1$ and $t_2$ represent two solutions of the saddlepoint equations, and a value meeting calculation reasonability is taken as a saddle point value in practical calculation; and $$a_1 = -\frac{9\theta_{Y_s}^3}{2(\eta_{Y_s}-3)^2}, a_2 = \frac{-3\theta_{Y_s}^3 + 2\eta_{Y_s} - 6}{4(\eta_{Y_s}-3)}, a_3 = \frac{27\theta_{Y_s}^4}{4(\eta_{Y_s}-3)^3}, b = \frac{\eta_{Y_s}-3}{3\theta_{Y_s}}$$

wherein $\theta_{Y_s}$ and $\eta_{Y_s}$ respectively represent skewness and kurtosis of the performance function.

5. The dynamic reliability evaluation method for a coupling faults of a middle trough of a scraper conveyor according to claim 1, wherein for details in the step 4:
   the dynamic copula function uses a dynamic t-copula function in a form:

$$C_t(u_1, u_2 \mid \rho, k) = \int_{-\infty}^{t_k^{-1}(u_1)} \int_{-\infty}^{t_k^{-1}(u_2)} \frac{1}{2\pi\sqrt{1-\rho^2}} \left[1 + \frac{s^2 - 2\rho st + t^2}{k(1-\rho^2)}\right]^{-(k+2)/2} ds\,dt,$$

wherein k and $\rho$ are parameters of the dynamic t-copula function, k is an invariable parameter, and $\rho$ is a time-varying parameter; a value of the time-varying parameter ρ at different time points is obtained in combination with the data samples collected at different time points through a maximum likelihood estimation method; and $u_1$ and $u_2$ represent obtained failure probabilities in the fracture failure mode and the static strength failure mode through calculation in the step 3.

6. The dynamic reliability evaluation method for a coupling faults of a middle trough of a scraper conveyor according to claim 1, wherein for details in the step 5:

according to an obtained failure probabilities $u_1$ and $u_2$ in the fracture failure mode and the static strength failure mode of the middle trough of the scraper conveyor in the step 3, and the obtained dynamic joint probability distribution function between the two failure modes in the step 4, dynamic reliability of the coupling faults of the middle trough of the scraper conveyor is calculated by the following formula, specifically:

$$P_f = u_1 + u_2 - P(u_1, u_2 | \rho),$$

wherein $P(u_1, u_2 | \rho)$ is a joint failure probability obtained through calculation according to the dynamic joint probability distribution function in the step 4; and through calculation on reliability at different time points, the dynamic reliability evaluation on the coupling faults of the middle trough of the scraper conveyor is obtained.

* * * * *